United States Patent

Hori et al.

[11] Patent Number: 5,985,183
[45] Date of Patent: Nov. 16, 1999

[54] PIEZORESISTANCE PASTE AND MECHANICAL SENSOR USING THE SAME

[75] Inventors: Yoshihiro Hori, Hirakata; Haruhiko Handa, Yamatotakada; Shinya Hasegawa, Uji; Masaki Ikeda, Hirakata, all of Japan

[73] Assignee: Matsushita Electric Industrial Co., Ltd., Osaka-fu, Japan

[21] Appl. No.: 09/031,053

[22] Filed: Feb. 26, 1998

[30] Foreign Application Priority Data

Mar. 11, 1997 [JP] Japan ..................................... 9-056552

[51] Int. Cl.[6] .............................. H01B 1/06; G01B 7/16; A47G 19/22
[52] U.S. Cl. ............................... 252/519.13; 252/519.14; 252/519.3; 252/521.4; 73/776; 73/777; 428/34.6
[58] Field of Search ........................... 252/519.3, 519.13, 252/519.14, 521.4; 73/776, 777; 428/34.6

[56] References Cited

U.S. PATENT DOCUMENTS

| | | |
|---|---|---|
| 4,452,726 | 6/1984 | Palanisamy et al. ................... 252/518 |
| 4,693,843 | 9/1987 | Kasanami et al. . | |
| 5,242,722 | 9/1993 | Hiraka et al. . | |
| 5,379,016 | 1/1995 | Smith et al. .............................. 338/308 |
| 5,474,711 | 12/1995 | Borland et al. .......................... 252/518 |
| 5,534,194 | 7/1996 | Borland et al. .......................... 252/518 |
| 5,914,559 | 6/1999 | Muchi et al. ............................. 313/479 |

FOREIGN PATENT DOCUMENTS

| | | |
|---|---|---|
| 03148101 | 6/1991 | Japan . |
| 07140022 | 6/1995 | Japan . |
| 08304200 | 11/1996 | Japan . |

Primary Examiner—D. Gassaway
Assistant Examiner—John M Petruncio
Attorney, Agent, or Firm—McDermott, Will & Emery

[57] ABSTRACT

The present invention provides a mechanical sensor high in sensitivity (GF) and reliability. The mechanical sensor comprises an insulating substrate, a pair of electrodes formed on the insulating substrate, and a piezoresistance element formed by connecting the electrodes. The piezoresistance element is substantially made of a glass of the $PbO-SiO_2-B_2O_3-Al_2O_3$ system comprising 73.1 to 86.7 wt % of PbO, 9.7 to 22.2 wt % of $SiO_2$, 2.5 to 5.0 wt % of $B_2O_3$ and 0.9 to 3.6 wt % of $Al_2O_3$ and a ruthenium oxide powder dispersed in the glass. The piezoresistance element is formed by coating and baking a paste containing the ruthenium oxide powder, a powder of the glass and an organic binder.

10 Claims, 6 Drawing Sheets

PIEZORESISTANCE PASTE AND MECHANICAL SENSOR USING THE SAME

BACKGROUND OF THE INVENTION

The present invention relates to a mechanical sensor for measuring dynamic quantities such as pressure, load, acceleration and displacement.

There has been a mounting demand in recent years for means to measure various dynamic quantities to improve the efficiency and function of facilities for air condition, electric instrumentation, housing equipment, electrification, factory automation and so on. The objects of measurement are varied from the load in a structure to the fluid pressure of gas or liquid, and a mechanical sensor which is applicable to many different measurements is sought for.

Heretofore, dynamic quantity measurement has been taken using a device such as a silicone semiconductor-type sensor and a strain gauge-type sensor employing a Cu—Ni alloy. These sensors are low in reliability and high in price. In addition, these can not every well be applied to wide use.

As replacement, there has been proposed a mechanical sensor comprising an insulating substrate, and a piezoresistance element and electrodes formed on the surface of the insulating substrate. When a stress is applied on the mechanical sensor, the substrate is deformed and the piezoresistance element which has been formed on the substrate is also deformed. A resistance value of the piezoresistance element changes as the length or the sectional area of the piezoresistance element changes. Therefore, the quantity of the applied stress is detected by reading a change in resistance value of the piezoresistance element. The sensitivity of such mechanical sensor is defined by gauge factor (hereinafter referred to as GF) representing the percentage of the change in resistance to the quantity of the strain as given below.

$$GF = \frac{\text{Change in Resistance}}{\text{Quantity of Strain}}$$

The substrate made of ceramics such as alumina has been used for the mechanical sensor.

In recent years, a metal-core substrate employing a metal base coated with an electric insulating layer on the surface thereof (an enameled substrate) which are excellent in elasticity and workability has come to be widely used. As the metal base, a stainless steel sheet or a cold rolled carbon steel sheet is employed for example. As the electric insulating layer formed on the metal base, a crystallized glass of $SiO_2$—$B_2O_3$—$CaO$—$MgO$ system is used, for example.

The piezoresistance element generally has a structure wherein a powder of an electroconductive material such as ruthenium oxide is dispersed in the glass. The piezoresistance element is formed by applying and baking on the substrate a mixture paste of the electroconductive material powder, a glass powder and an organic binder.

A protection layer is provided on the surface of the sensor thus obtained as necessary.

However, any of the mechanical sensors employing the piezoresistance element materials and metal-core substrate has failed to have a sufficient sensitivity to be used in various applications so far.

As the conceivable causes which affect the strain-sensitive characteristics of the mechanical sensor, interface reactions between the electroconductive materials and the glass in the piezoresistance element and reactions between the components in the piezoresistance element and the substrate components can be considered. These points are now subjected for extensive researches to improve the strain-sensitive characteristics (GF) or the sensitivity of the sensor. For example, a thicker piezoresistance element is studied to lower a ratio of the portion where the components are assumed to react with the substrate components in the piezoresistance element. In this method, thicker the piezoresistance element, higher the strain-sensitive characteristics of the sensor. However, formation of the thicker piezoresistance element causes foaming on and inside the piezoresistance element which results in an increased variation in sensor characteristics as shown in FIG. 6.

BRIEF SUMMARY OF THE INVENTION

An object of the present invention is to solve the foregoing problems and provide a mechanical sensor with a high sensitivity (high GF) and high reliability.

The mechanical sensor according to the present invention comprises a piezoresistance element containing a glass and a ruthenium oxide powder dispersed in the glass, the glass being a $PbO$—$SiO_2$—$B_2O_3$—$Al_2O_3$ system glass comprising 73.1 to 86.7 wt % of $PbO$, 9.7 to 22.2 wt % of $SiO_2$, 2.5 to 5.0 wt % of $B_2O_3$ and 0.9 to 3.6 wt % of $Al_2O_3$.

The piezoresistance element is formed, for example, by applying a paste containing a powder of ruthenium oxide, a powder of the glass having the foregoing composition and an organic binder on a substrate and baking the paste.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
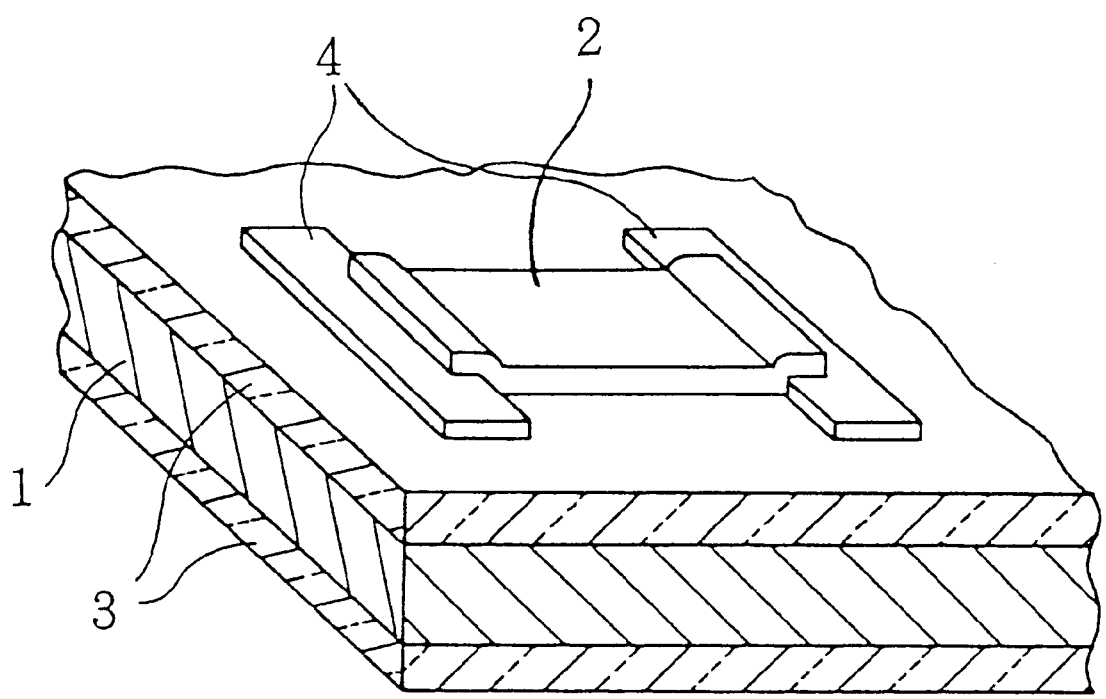
FIG. 1 is a partially cutaway view in perspective of a mechanical sensor of an embodiment of the present invention.

The mechanical sensor according to the present invention comprises: an insulating substrate; a pair of electrodes provided on the insulating substrate; and a piezoresistance element formed in connect with the electrodes, the piezoresistance element substantially consisting of a glass of the $PbO$—$SiO_2$—$B_2O_3$—$Al_2O_3$ system comprising 73.1 to 86.7 wt % of PbO, 9.7 to 22.2 wt % of $SiO_2$, 2.5 to 5.0 wt % of $B_2O_3$ and 0.9 to 3.6 wt % of $Al_2O_3$ and a ruthenium oxide powder dispersed in the glass.

In a preferred mode of the present invention, the ruthenium oxide powder is contained in the piezoresistance element at 10 to 30 parts by weight per 100 parts by weight of the sum of the ruthenium oxide power and the glass.

In another preferred mode of the present invention, the mean particle diameter of the ruthenium oxide powder is 0.5 to 3.0 $\mu$m.

In still another preferred mode of the present invention, the insulating substrates include a substrate of ceramics such as alumina and a substrate of a metal base with a crystallized glass layer provided on the surface as an insulating layer.

The preferred metal base materials to be used in the mechanical sensor of the present invention are such alloys as cold rolled carbon steels, stainless steels, silicon steels, nickel-chromium-iron, nickel-iron, covar and invar and their clad materials. Of these, the stainless steels, especially SUS 430, are the most suitable in view of adhesion to the insulating layer.

The metal base material is formed into a desired shape by usual machining, etching, laser technique or the like. The shape is chosen among cylinder, plate (foil included) and others, depending on a level of load and a kind of use.

To enhance the adhesion of the insulating layer to be formed, the surface of the metal base is degreased, then sand-blasted and plated with nickel or cobalt, followed by thermal oxidation treatment to form an oxide coating layer on the surface.

On the metal base, an insulating layer of a crystallized glass is formed. A non-alkali crystallized glass which deposits a crystal phase of the MgO type in baking, for example, is preferable as a crystallized glass layer in view of electric insulating property or heat resistance. Especially desirable is a glass composed of 7 to 30 wt % of $SiO_2$, 5 to 34 wt % of $B_2O_3$ and 0 to 20 wt % of CaO, 16 to 50 wt % of MgO, 0 to 40 wt % of $La_2O_3$, 0 to 5 wt % of $ZrO_2$ and 0 to 5 wt % of $P_2O_5$.

The suitable methods for coating the metal base with the crystallized glass layer include spraying, powder electrostatic coating and electrophoretic coating, for example. The most suitable is the electrophoretic coating because of closeness of coat, high electric insulating property and other reasons.

Here explained an example of forming the crystallized glass layer by electrophoretic coating. At first, an alcohol and a small quantity of water are added to a glass frit, which is then milled in a ball mill for about 20 hours to pulverize the glass frit into a powder having a mean particle diameter of 1 to 5 $\mu$m. The slurry thus prepared is placed in an electrolytic bath and circulated. Then, the metal base is dipped in this slurry to let the glass powder deposit on the surface of the metal base by negative polarizing at 300 volts. The metal base is then dried and baked. In baking, the glass particles are fused and a glass layer is formed on the surface of the metal base. At this time, since the components of the glass powder and the components of the metal base are well diffused mutually, a firm adhesion can be obtained between the glass layer and the metal base.

It is desirable that the baking temperature is gradually raised from a room temperature to a required temperature. In this method, countless numbers of very fine needle crystals can be deposited, and thus the obtained glass layer is high in mechanical strength and in adhesion to a piezoresistance element to be formed thereon.

To form the piezoresistance element, a paste containing a ruthenium oxide powder, a glass powder and an organic binder is prepared and applied on an insulating substrate by drawing, screen printing, metal mask printing, doctor blade coating or offset printing and baking the insulating substrate, for example. As the organic binder, a cellulose derivative or an acrylic resin is used preferably. To dissolve the organic binder, such solvents as terpineol and butylcarbitol acetate are used alone or in combination.

Preferred embodiments of the present invention will now be described in detail with reference to the accompanying drawings.

There will now be illustrated a sample for measurement of GF value having a piezoresistance element formed according to the foregoing preparation procedure.

A mechanical sensor shown in FIG. 1 was obtained as follows. A metal base 1 of a stainless steel SUS 430 with a length of 100 mm, a width of 30 mm and a thickness of 0.8 mm was pretreated by degreasing, rinsing, acid cleaning, rinsing, nickel plating and rinsing. This metal base 1 was then dipped in a slurry containing a crystallized glass powder dispersed therein. The crystallized glass powder is composed of 13 wt % of $SiO_2$, 25 wt % of $B_2O_3$, 39 wt % of MgO, 3 wt % of CaO, 5 wt % of $La_2O_3$, 2 wt % of $ZrO_2$ and 1 wt % of $P_2O_5$. Then, a dc voltage was applied between the counter electrode and the metal base 1 to coat the surface of the metal base 1 with the crystallized glass particles. The metal base 1 coated with the crystallized glass particles was heated from a room temperature up to 880° C. over two hours and then maintained at the temperature for 10 minutes. Thus obtained was an insulating substrate provided with a 100 $\mu$m thick insulating layer 3 of the crystallized glass as shown in FIG. 1.

In the next step, an Ag—Pt paste was printed on the surface of the insulating layer 3 by screen printing, which was then baked at 800° C. to form a pair of electrodes 4.

Each glass powder shown in Tables 1 to 3 (numbers 1 to 21) having a mean particle diameter of 3 $\mu$m was mixed with a ruthenium oxide powder having a mean particle diameter of 1.2 $\mu$m in a ratio of 4:1 by weight, respectively. This mixture was given an addition of about 20 parts by weight of an organic vehicle containing ethylcellulose and terpineol as the main components, per 100 parts by weight of the sum of the ruthenium oxide powder and the glass powder. It was then kneaded in a mortar, and further milled on a three-roll mill for two hours to produce a piezoresistance paste. In kneading in the mortar and milling on the roll mill, diethylene glycol monobuyl ether acetate as a diluent was added as necessary to adjust the viscosity of the paste.

EXAMPLE 1

The paste thus obtain ed was so printed on the insulating substrate in a specified pattern as to connect a pair of electrodes 4 formed thereon. The insulating substrate was then dried in a drier for 30 minutes at 120° C. and further baked for 10 minutes at a peak temperature of 800° C. to produce a piezoresistor element 2.

Glasses with composition numbers 1 to 8 shown in Table 1 are varied in the ratio of $SiO_2$ to PbO while the addition of the other components being unchanged. Glasses with composition numbers 9 to 13 shown in Table 2 are varied in the addition of $Al_2O_3$ (indicated as $AlO_{1-5}$ in the table) while the addition of the other components being unchanged. Glasses with composition numbers 14 to 21 shown in Table 3 are varied in the addition of $B_2O_3$ (indicated as $BO_{1-5}$ in the table) while the addition of the other components being unchanged.

TABLE 1

| | Composition/wt % | | | | Acid | | Noise/ | σ of resistance/ |
|---|---|---|---|---|---|---|---|---|
| | $SiO_2$ | $BO_{1.5}$ | PbO | $AlO_{1.5}$ | resistance | GF | dB | % |
| 1 | 26.4 | 3.8 | 68.7 | 1.1 | o | 13 | 1 | 5 |
| 2 | 22.2 | 3.6 | 73.1 | 1.1 | o | 16 | 1 | 5 |
| 3 | 20.3 | 3.5 | 75.3 | 1.0 | o | 18 | 0 | 5 |
| 4 | 18.5 | 3.3 | 77.2 | 1.0 | o | 20 | 0 | 5 |
| 5 | 16.8 | 3.2 | 79.0 | 1.0 | o | 21 | 0 | 5 |
| 6 | 15.2 | 3.2 | 80.7 | 0.9 | o | 23 | 0 | 5 |
| 7 | 9.7 | 2.8 | 86.7 | 0.9 | o | 21 | 2 | 10 |
| 8 | 7.4 | 2.7 | 89.2 | 0.8 | o | — | 9 | 50 |

TABLE 2

| | Composition/wt % | | | | Acid | | Noise/ | σ of resistance/ |
|---|---|---|---|---|---|---|---|---|
| | $SiO_2$ | $BO_{1.5}$ | PbO | $AlO_{1.5}$ | resistance | GF | dB | % |
| 9 | 15.4 | 3.2 | 81.5 | 0.0 | x | 21 | 0 | 5 |
| 10 | 15.2 | 3.2 | 80.7 | 0.9 | o | 23 | 0 | 5 |
| 11 | 15.1 | 3.1 | 80.0 | 1.8 | o | 20 | 0 | 5 |
| 12 | 14.8 | 3.1 | 78.6 | 3.6 | o | 18 | 2 | 10 |
| 13 | 14.7 | 3.0 | 77.9 | 4.5 | o | — | 7 | 20 |

TABLE 3

| | Composition/wt % | | | | Acid | | Noise/ | σ of resistance/ |
|---|---|---|---|---|---|---|---|---|
| | $SiO_2$ | $BO_{1.5}$ | PbO | $AlO_{1.5}$ | resistance | GF | dB | % |
| 14 | 15.5 | 1.3 | 82.3 | 0.9 | o | 15 | 3 | 20 |
| 15 | 15.3 | 2.5 | 81.2 | 0.9 | o | 19 | 1 | 10 |
| 16 | 15.2 | 3.2 | 80.7 | 0.9 | o | 23 | 0 | 5 |
| 17 | 15.1 | 3.8 | 80.2 | 0.9 | o | 21 | 0 | 5 |
| 18 | 15.0 | 4.4 | 79.7 | 0.9 | o | 20 | 0 | 5 |
| 19 | 14.9 | 4.9 | 79.2 | 0.9 | o | 20 | 0 | 10 |
| 20 | 14.8 | 5.5 | 78.7 | 0.9 | x | 18 | 0 | 10 |
| 21 | 14.7 | 6.1 | 78.3 | 0.9 | x | 16 | 0 | 10 |

Thus obtained mechanical sensors using the glasses were subjected to tests to determine GF values, noise levels and resistance values. The results are also shown in Tables 1 to 3. By the way, when a wide application of a mechanical sensor is considered, it is desired that the GF value should be not lower than 15, the noise level be not higher than 5 dB and the variation (standard deviation σ) of resistance value be within 10%.

Acid resistance of each glass was also evaluated since the acid resistance of glass itself has a direct effect on the reliability of the piezoresistance element. This evaluation involved dipping each glass in a 5% aqueous solution of citric acid for 30 minutes. The results are indicated in the sign "o" for the glasses with a weight loss per unit area of 10 mg/cm² or less, the sign "Δ" for the glasses with the weight loss per unit area of more than 10 mg/cm² and less than 20 mg/cm², and the sign "x" for the glasses with the weight loss per unit area of 20 Mg/cm² or more.

As is evident from the Table 1, the GF value of the sensor is improved with increasing content of PbO in the piezoresistance element. When the content of PbO is 73.1 wt % or more, the GF value exceeds the targeted value of 15. However, when the content of PbO goes up beyond 86.7 wt %, the acid resistance decreases and stability of the piezoresistance element is worsened as reflected in the noise level and the variation of the resistance value, since the glass gradually exhibits a growing tendency to crystallize. With the samples employing the piezoresistance elements containing 89.2 wt % of PbO, no stable resistance measurements were obtained and the GF value could not be determined. Therefore, it is desirable that the preferable content of $SiO_2$ ranges from 9.7 to 22.2 wt %, while the preferable content of PbO ranges from 73.1 to 86.7 wt %.

As shown in Table 2, the acid resistance goes up with increasing content of $Al_2O_3$ in the piezoresistance element. But as in the case of the compositions shown in Table 1 where the addition of $SiO_2$ and PbO is varied, the glass increases a tendency to crystallize with increasing content of $Al_2O_3$, resulting in deteriorating in stability of the piezoresistance element. It follows from this that the preferable content of $Al_2O_3$ ranges from 0.9 to 3.6 wt %.

As shown in Table 3, the stability of the piezoresistance element is improved with increasing content of $B_2O_3$ in the piezoresistance element. It is considered that ruthenium oxide tends to react with the components in the glass and to deposit as lead ruthenate when the content of $B_2O_3$ is low. On the contrary, when the content of $B_2O_3$ is 5.5 wt % or more, the acid resistance falls. It is considered that the bond of the glass network becomes weak as the content of $B_2O_3$ rises. This indicates that the preferable content of $B_2O_3$ ranges from 2.5 to 4.9 wt %.

Comparative Example

The glass samples with the compositions given in Table 4 were examined in the same way as in Example 1. Glasses of numbers 22 and 23 are equal in composition to the 6th glass excepting that PbO is replaced with $BiO_{1-5}$. Glasses of numbers 24 and 25 are glasses of the $B_2O_3$—PbO—$Fe_2O_3$ (indicated as $FeO_{1-5}$ in the table) system containing no $SiO_2$, and glasses of numbers 26, 27 and 28 are also glasses of the tellurite type containing no $SiO_2$.

TABLE 4

| | Composition/wt % | | | | | | | Acid | | Noise | σ of resistance/ |
|---|---|---|---|---|---|---|---|---|---|---|---|
| | $SiO_2$ | $BO_{1.5}$ | PbO | $AlO_{1.5}$ | $FeO_{1.5}$ | $BiO_{1.5}$ | TeO | resistance | GF | dB | % |
| 22 | 15.1 | 3.1 | 64.1 | 0.9 | — | 16.7 | — | o | 13 | 1 | 5 |
| 23 | 15.0 | 3.1 | 47.8 | 0.9 | — | 33.2 | — | o | 12 | 1 | 5 |
| 24 | — | 22.5 | 73.4 | — | 4.1 | — | — | x | 16 | 6 | 30 |

TABLE 4-continued

| | Composition/wt % | | | | | | Acid resistance | GF | Noise dB | σ of resistance/ % |
|---|---|---|---|---|---|---|---|---|---|---|
| | SiO$_2$ | BO$_{1.5}$ | PbO | AlO$_{1.5}$ | FeO$_{1.5}$ | BiO$_{1.5}$ | TeO | | | | |
| 25 | — | 21.8 | 69.9 | — | 8.3 | — | — | x | 14 | 7 | 50 |
| 26 | — | 4.6 | 29.5 | 0.7 | — | 12.3 | 52.8 | Δ | 10 | 1 | 20 |
| 27 | — | 4.7 | 15.0 | 1.4 | — | 25.1 | 53.8 | x | 8 | 2 | 10 |
| 28 | — | 4.7 | 7.6 | 1.7 | — | 31.7 | 54.3 | x | 6 | 2 | 10 |

The glasses of numbers 22 and 23 fall in GF value with decreasing content of PbO. It is considered that the glasses of numbers 22 and 23 are low in stability of resistance value and in acid resistance because the glasses contain no SiO$_2$. The glasses of numbers 26, 27 and 28 are stable in resistance value but poor in acid resistance because the content of TeO$_2$ plays the role of that of SiO$_2$.

EXAMPLE 2

Piezoresistance pastes were prepared by mixing a glass powder with a mean particle diameter of 3 μm which have the same composition as the glass of number 6 in Example 1 and the ruthenium oxide powder with a mean particle diameter of 1.2 μm in such ratios that the content of ruthenium oxide was at 10 to 35 parts by weight per 100 parts by weight of the sum of the ruthenium oxide powder and the added glass powder. Using these piezoresistance pastes, mechanical sensors were made in the same manner as in Example 1.

The characteristics of the sensors obtained were evaluated in the same was as in Example 1.

Figure 2:
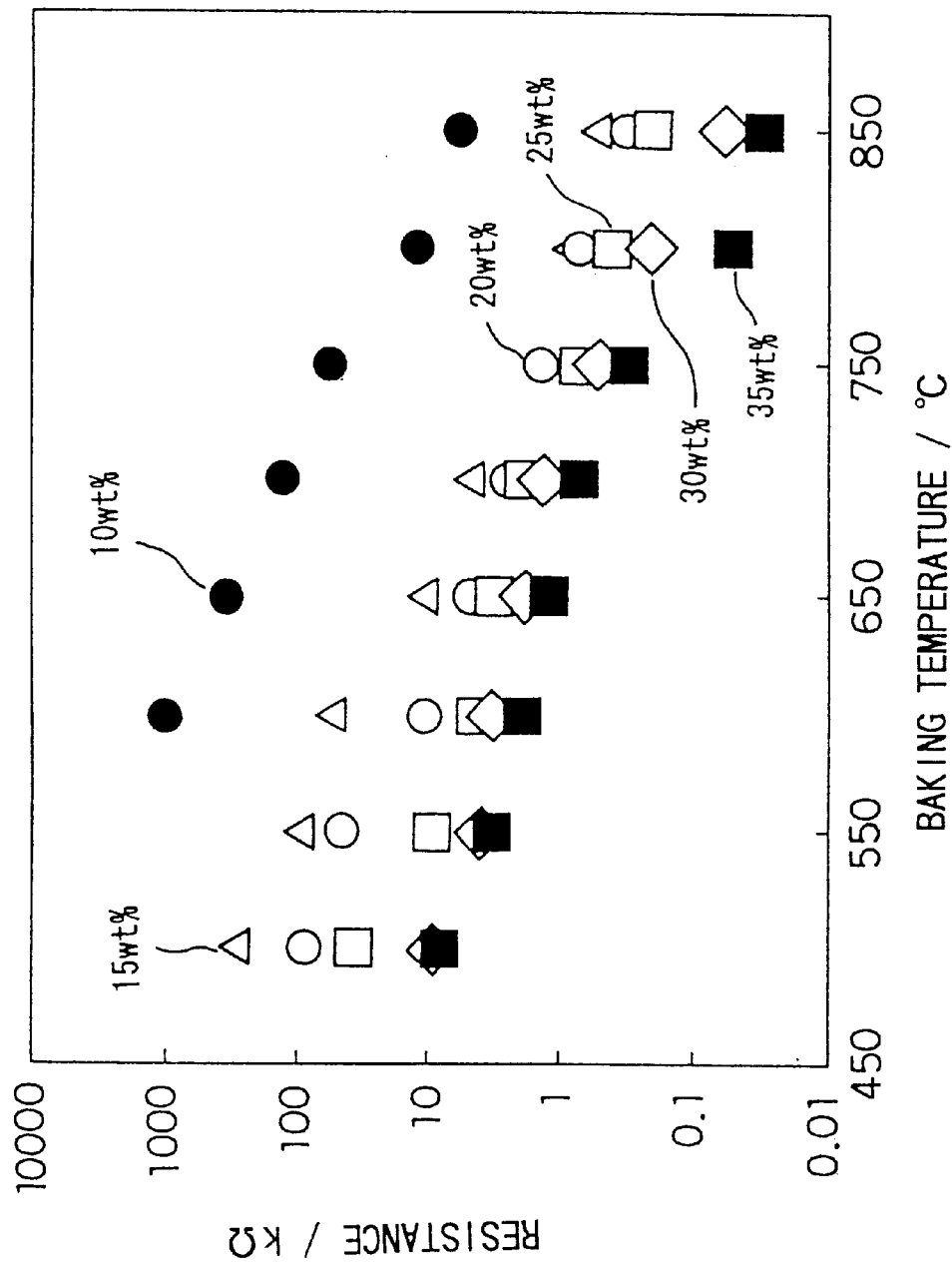
FIG. 2 is a characteristics diagram showing a relationship between a baking temperature for forming a piezoresistance element and a resistance value of the piezoresistance element with each mixing ratio of a ruthenium oxide powder and a glass powder in the employed piezoresistance paste.

FIG. 2 shows the relationship between the baking temperatures of the paste and the resistance values of the piezoresistance elements. As shown in FIG. 2, at any mixing ratio, the resistance value falls with rising the baking temperature. It is also indicated that the resistance value drops as the content of ruthenium oxide in the piezoresistance element increases, when the baking temperature is fixed.

Considering the power consumption, self heat-generation and other factors in service, it is desirable resistance value should be about 10 kΩ. Therefore, mechanical sensors with a resistance value of about 10 kΩ were made with varied contents of ruthenium oxide and put to characteristics evaluation in the same way as in Example 1.

Figure 3:
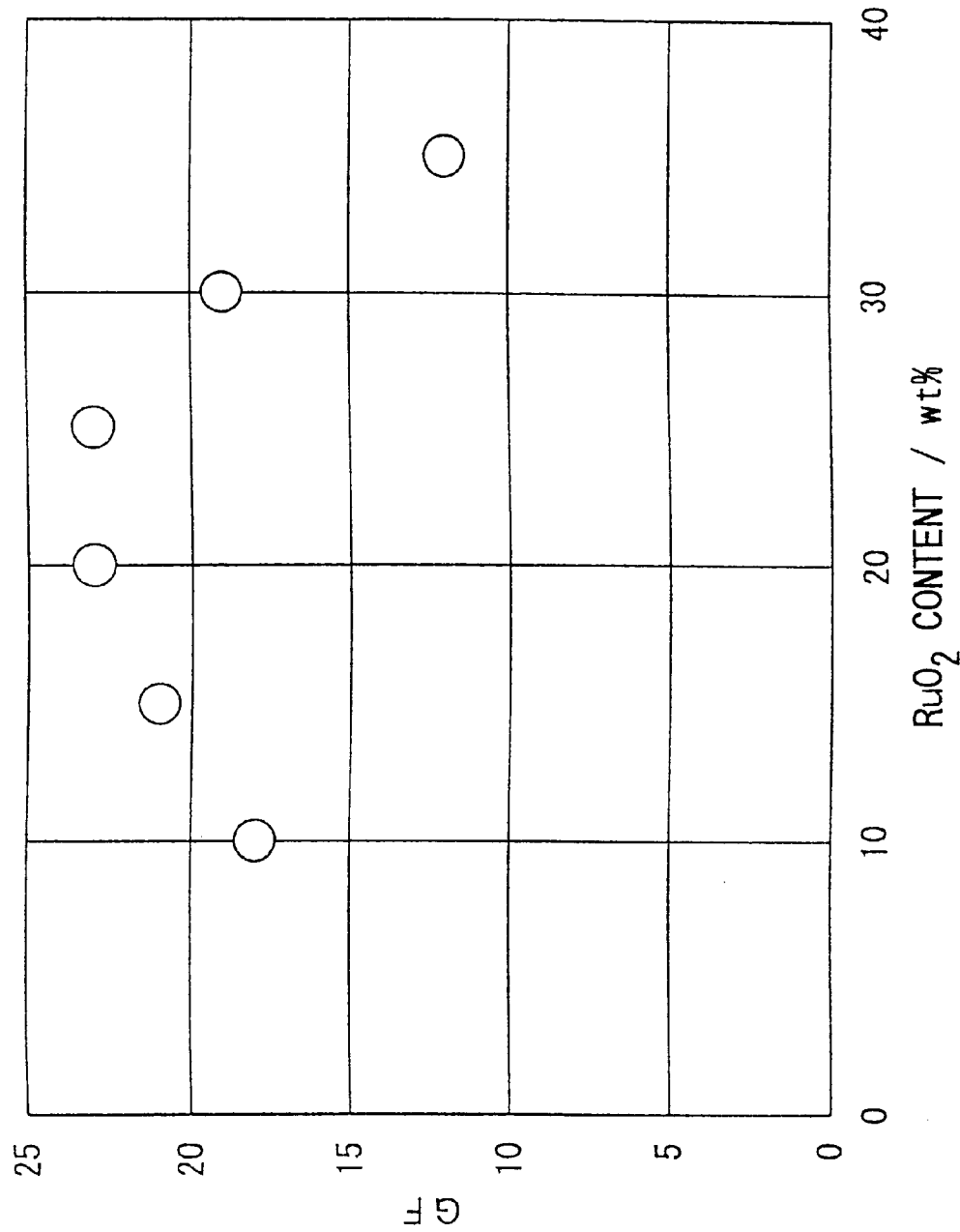
FIG. 3 is a characteristics diagram showing a relationship between a content of ruthenium oxide in the piezoresistance element of the mechanical sensor and a GF value of the mechanical sensor with the constant resistance value.

Illustrated in FIG. 3 is the relationship between the content of ruthenium oxide and the GF value at the resistance value of 10 kΩ. It is shown that the GF value is improved, as the content of ruthenium oxide increases. That is, it is considered, because with a low content of ruthenium oxide in the piezoresistance element, baking has to be carried out at a higher temperature than that with a high content of ruthenium oxide if the same level of resistance value is to be secured. That is to say, it is surmised that baking at high temperature accelerates an interfacial reaction between the substrate and the piezoresistance element, bringing down the GF value. If the content of ruthenium oxide is lower than 10 parts by weight, noise level will be 6 dB or higher.

Furthermore, so low content of ruthenium oxide will cause a large variation in resistance value of 10% or higher. On the other hand, if the content of ruthenium oxide is higher than 25 parts by weight, the contacts among RuO$_2$ particles will increase, with the GF value tending to fall. From these results, desirable content of ruthenium oxide ranges from 10 to 30 parts by weight per 100 parts by weight of the sum of ruthenium oxide and glass, if the targeted characteristics are to be obtained.

EXAMPLE 3

Piezoresistance pastes were prepared by mixing a ruthenium oxide powder with a mean particle diameter of 0.1 to 5.0 μm and a glass powder with a mean particle diameter of 3 μm of the same composition as the glass of number 6 in Example 1 in a mixing ratio of 1:4 by weight. Using these piezoresistance pastes, mechanical sensors were made in the same manner as in Example 1.

Figure 4:
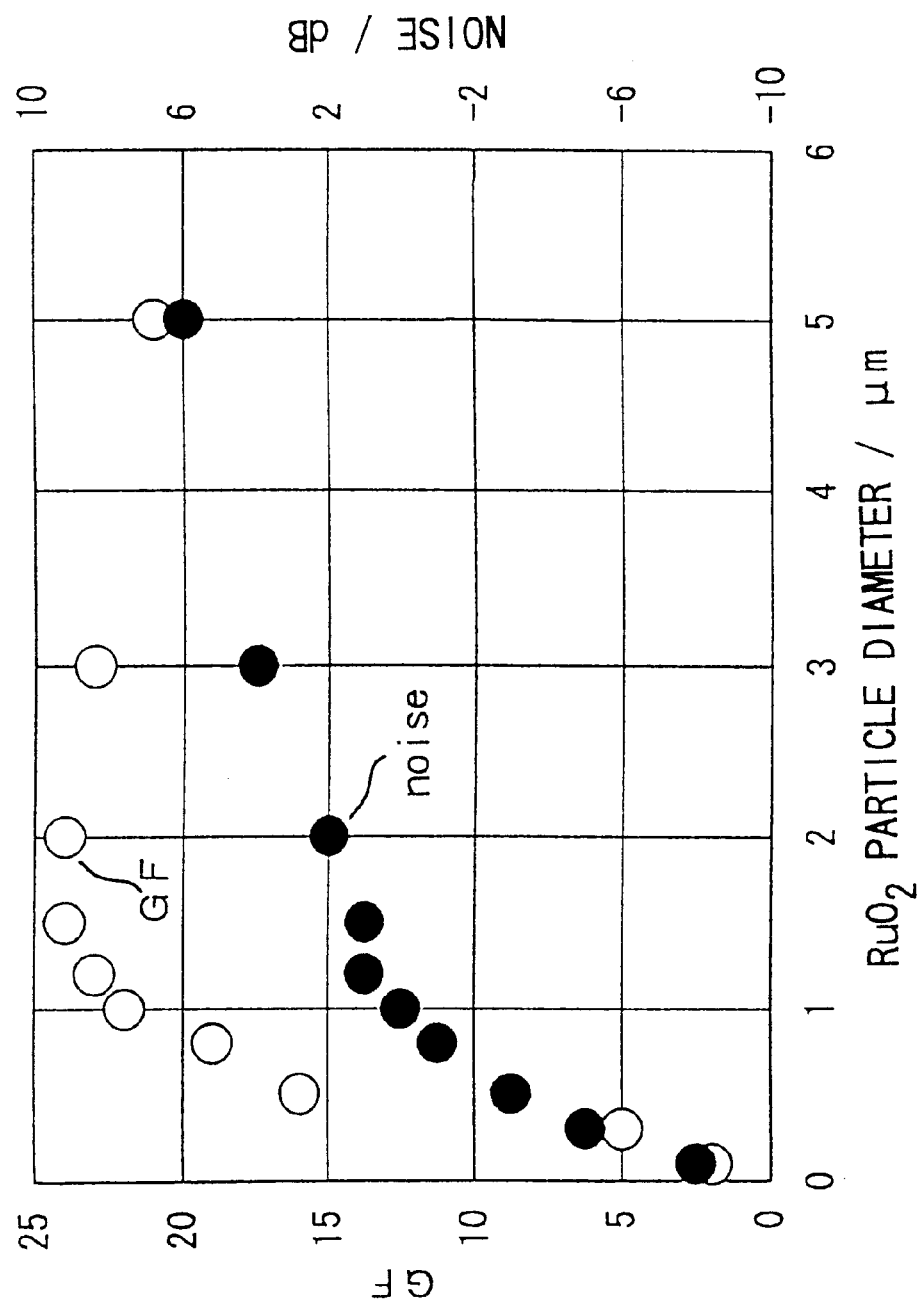
FIG. 4 is a characteristics diagram showing a relationship between a mean particle diameter of the ruthenium oxide powder in the piezoresistance element and the GF value or noise level of the mechanical sensor.

The characteristics of the sensors obtained were evaluated in the same was as in Example 1. FIG. 4 shows the relationship between the mean particle diameter of ruthenium oxide and the GF value or the noise level. As shown in FIG. 4, the GF value is improved with increasing the particle diameter of ruthenium oxide and exceeds the targeted level of 15 when the mean particle diameter is 0.5 μm or more. But as the mean particle diameter gets larger than 1.5 μm, the GF value falls. Meanwhile, the noise level deteriorates as the particle diameter increases. If the mean particle diameter exceeds 3.0 μm, the noise level will be larger than the target of 5 dB. Therefore, it is desired that the mean particle diameter of ruthenium oxide should be in a range of 0.5 to 3.0 μm.

EXAMPLE 4

Piezoresistance pastes were prepared by mixing a ruthenium oxide powder with a mean particle diameter of 1.2 μm and a glass powder with a mean particle diameter of 1 to 20 μm of the same composition as the glass of number 6 in Example 1 in a mixing ratio of 1:4 by weight. Using these piezoresistance pastes, mechanical sensors were made in the same manner as in Example 1.

Figure 5:
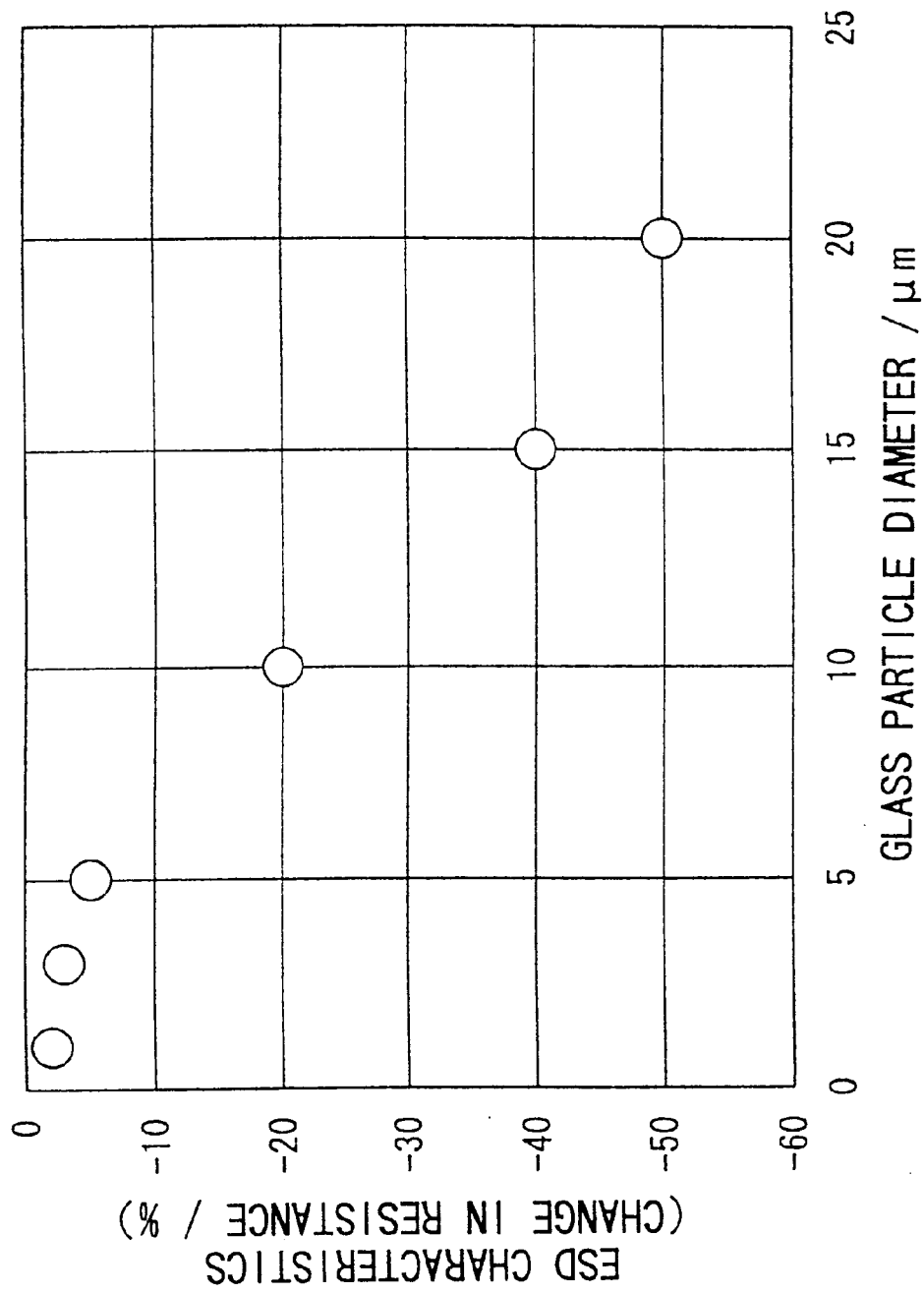
FIG. 5 is a characteristics diagram showing a relationship between the mean particle diameter of the glass powder used in the piezoresistance paste and a static electricity characteristics of the obtained mechanical sensor.
Figure 6:
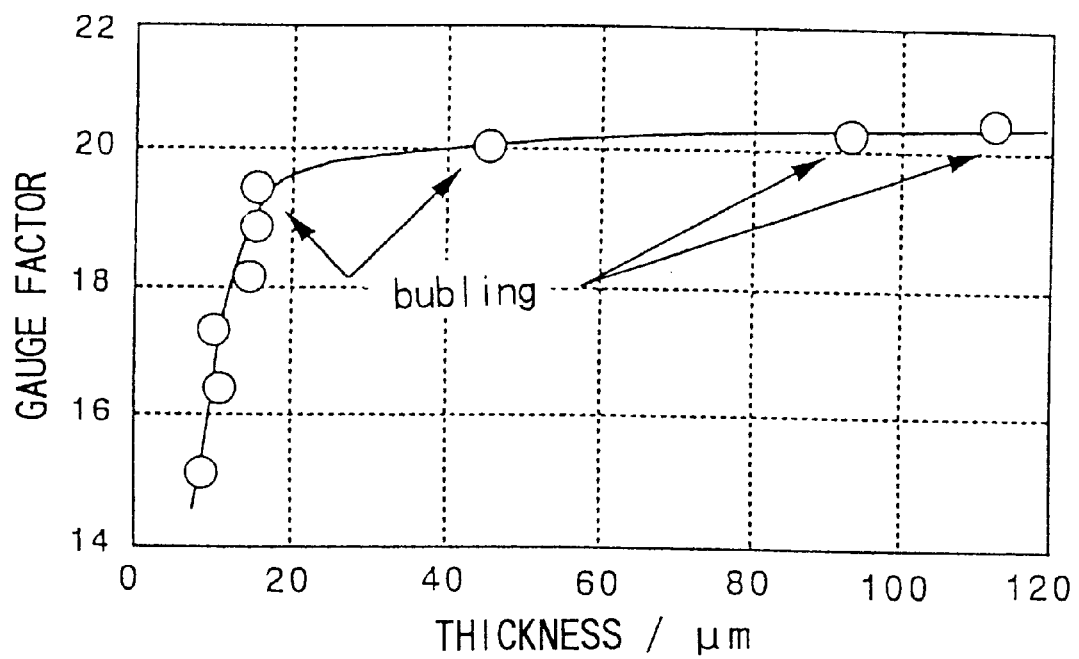
FIG. 6 is a characteristics diagram showing a relationship between a thickness of the piezoresistance element and the GF value of the mechanical sensor.

The mechanical sensors thus made were examined with regard to electrostatic discharge (ESD) characteristics. In this test, the piezoresistance elements were charged to a potential of 1.5 kV with an electric capacity of the piezoresistance element as 150 pF, and the charge was discharged through a 330Ω resistance. This procedure was repeated 10 times, and then there was examined a change in resistance value of the piezoresistance element before and after the test. it is desired that the change in resistance value under those conditions should be −10% or smaller (10% or less in absolute value). FIG. 5 shows the relationship between the electrostatic characteristics and the diameter of glass particles. The change in resistance value decreases as the glass particle diameter decreases. The absolute value of the change becomes 10% or less when the mean particle diameter is 5 μm or less. Therefore, it is desirable that the glass particle diameter should be 5 μm or less. It is noted that irrespective of the glass particle diameter, the GF value remains at about 20. That is to say, little effect on GF value of the glass particle diameter was observed.

While the examples given have been described with reference to insulating substrates having a metal base provided with a crystallized glass layer on the surface thereof, it is to be understood that a mechanical sensor with a high sensitivity can also be obtained in the same way by using a ceramic substrate in place of the metal base substrate. In other words, it can be expected that the interface reaction between the substrate and the piezoresistance element can be kept down and the bond between ruthenium oxide particles and glass contained in the piezoresistance element will also be improved if the glass which shows excellent characteristics in the foregoing examples, that is a $PbO$—$SiO_2$—$B_2O_3$—$Al_2O_3$ system glass containing 73.1 to 86.7 wt % of PbO, 9.7 to 22.2 wt % of $SiO_2$, 2.5 to 5.0 wt % of $B_2O_3$ and 0.9 to 3.6 wt % of $Al_2O_3$.

As has been described, the present invention provides a mechanical sensors with a high sensitivity and high reliability.

The entire disclosure of Japanese Patent Application No. Hei 9-56552 filed on Mar. 11, 1997 including specification, claims, drawings and summary are incorporated herein by reference in its entirely.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A mechanical sensor comprising: an insulating substrate; a pair of electrodes formed on said insulating substrate; and a piezoresistance element formed by connecting said electrodes, wherein said piezoresistance element is substantially made of a glass of $PbO$—$SiO_2$—$B_2O_3$—$Al_2O_3$ system comprising 73.1 to 86.7 wt % of PbO, 9.7 to 22.2 wt % of $SiO_2$, 2.5 to 5.0 wt % of $B_2O_3$ and 0.9 to 3.6 wt % of $Al_2O_3$, and a ruthenium oxide powder dispersed in said glass.

2. The mechanical sensor in accordance with claim 1, wherein said insulating substrate comprises a metal base provided with a crystallized glass layer on the surface thereof.

3. The mechanical sensor in accordance with claim 1, wherein said piezoresistance element contains 10 to 30 parts by weight of said ruthenium oxide powder per 100 parts by weight of the sum of said ruthenium oxide powder and said glass.

4. The mechanical sensor in accordance with claim 1, wherein said ruthenium oxide powder has a mean particle diameter in a range of 0.5 to 3.0 μm.

5. The mechanical sensor in accordance with claim 1, wherein said piezoresistance element is obtained by baking a paste containing said ruthenium oxide powder, said glass powder and an organic binder.

6. The mechanical sensor in accordance with claim 5, wherein said glass powder has a mean particle diameter of 5 μm or less.

7. A piezoresistance paste which comprises a ruthenium oxide powder, a glass powder and an organic binder, said glass powder being of $PbO$—$SiO_2$—$B_2O_3$—$Al_2O_3$ system comprising 73.1 to 86.7 wt % of PbO, 9.7 to 22.2 wt % of $SiO_2$, 2.5 to 5.0 wt % of $B_2O_3$ and 0.9 to 3.6 wt % of $Al_2O_3$.

8. The piezoresistance paste in accordance with claim 7, wherein the addition of said ruthenium oxide is 10 to 30 parts by weight per 100 parts by weight of the sum of said ruthenium oxide and said glass powder.

9. The piezoresistance paste in accordance with claim 7, wherein said ruthenium oxide powder has a mean particle diameter in a range of 0.5 to 3.0 μm.

10. The piezoresistance paste in accordance with claim 7, wherein said glass powder has a mean particle diameter of 5 μm or less.

* * * * *

UNITED STATES PATENT AND TRADEMARK OFFICE
CERTIFICATE OF CORRECTION

PATENT NO. : 5,985,183
DATED : November 16, 1999
INVENTOR(S) : Hori, et. al.

It is certified that error appears in the above-identified patent and that said Letters Patent is hereby corrected as shown below:

On the Cover Page:
Item [57],
In the Abstract section, line 7, change "$B_2\text{-}O_3$" to --$B_2O_3$--.

Signed and Sealed this

Fourteenth Day of November, 2000

Attest:

Attesting Officer

Q. TODD DICKINSON

Director of Patents and Trademarks